US008559017B2

(12) United States Patent
Schulz et al.

(10) Patent No.: US 8,559,017 B2
(45) Date of Patent: Oct. 15, 2013

(54) METHOD FOR ALIGNING A PLURALITY OF SUB-APERTURES OF A MULTIPLE-APERTURE IMAGING SYSTEM

(75) Inventors: Timothy J. Schulz, Houghton, MI (US); Richard G. Paxman, Saline, MI (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 221 days.

(21) Appl. No.: 13/225,127

(22) Filed: Sep. 2, 2011

(65) Prior Publication Data
US 2013/0056650 A1    Mar. 7, 2013

(51) Int. Cl.
    *G01B 11/27* (2006.01)
(52) U.S. Cl.
    USPC .......................................... 356/510; 356/618
(58) Field of Classification Search
    USPC .................. 356/124, 508, 510, 513, 618, 905
    See application file for complete search history.

(56) References Cited

U.S. PATENT DOCUMENTS

| | | | | |
|---|---|---|---|---|
| 4,825,062 A * | 4/1989 | Rather et al. | | 250/201.1 |
| 4,967,077 A * | 10/1990 | Watson | | 250/237 R |
| 5,113,064 A * | 5/1992 | Manhart | | 250/201.9 |
| 5,208,654 A * | 5/1993 | Shao et al. | | 356/498 |
| 7,119,955 B1 * | 10/2006 | Sigler et al. | | 359/423 |
| 7,352,470 B1 * | 4/2008 | Kendrick et al. | | 356/456 |
| 7,372,569 B2 * | 5/2008 | Hutchin | | 356/399 |
| 7,385,705 B1 * | 6/2008 | Hoctor et al. | | 356/456 |
| 8,233,148 B2 * | 7/2012 | Bodkin et al. | | 356/328 |
| 8,456,644 B2 * | 6/2013 | Evans et al. | | 356/513 |
| 2003/0227696 A1 * | 12/2003 | Maker | | 359/850 |
| 2005/0237644 A1 * | 10/2005 | Rhoads | | 359/872 |
| 2010/0053634 A1 * | 3/2010 | Lyon | | 356/508 |
| 2010/0053635 A1 * | 3/2010 | Lyon | | 356/510 |
| 2011/0157600 A1 * | 6/2011 | Lyon | | 356/508 |

OTHER PUBLICATIONS

"Joint estimation of object and aberrations by using phase diversity," Journal of the Optical Society A, vol. 9, Jul. 1992, pp. 1072-1085, by Paxman, et al.

* cited by examiner

*Primary Examiner* — Mark Consilvio
(74) *Attorney, Agent, or Firm* — Ingrassia Fisher & Lorenz, P.C.

(57) ABSTRACT

A method for aligning a plurality of sub-apertures of a multiple-aperture imaging system including, but not limited to, identifying one sub-aperture to serve as a reference sub-aperture, actuating the reference sub-aperture in a series of piston steps of a known amount, collecting data relating to each image of a plurality of images of a point object, each image corresponding to a respective piston step, compiling the data into a three-dimensional data cube, detecting a plurality of fringes positioned within the three-dimensional data cube, determining the relative location of each sub-aperture of the plurality of sub-apertures based on a location of each fringe of the plurality of fringes within the three-dimensional data cube, and actuating a piston associated with at least one sub-aperture based, at least in part, on the relative location to move the at least one sub-aperture into alignment with another sub-aperture and repeating with each remaining sub-aperture until all sub-apertures are at substantially the same piston height.

20 Claims, 12 Drawing Sheets

Reference Sub-Aperture
Piston Position

| Sub-Aperture 32 | 0.0 Waves |
| Sub-Aperture 36 | 4.0 Waves |
| Sub-Aperture 38 | 5.5 Waves |
| Sub-Aperture 40 | 2.0 Waves |
| Sub-Aperture 42 | -0.5 Waves |

| Sub-Aperture 32 | -0.5 Waves |
| Sub-Aperture 36 | 3.5 Waves |
| Sub-Aperture 38 | 5.0 Waves |
| Sub-Aperture 40 | 1.5 Waves |
| Sub-Aperture 42 | -1.0 Waves |

| | |
|---|---|
| Sub-Aperture 32 | -2.7 Waves |
| Sub-Aperture 36 | 0.4 Waves |
| Sub-Aperture 38 | 2.6 Waves |
| Sub-Aperture 40 | -0.5 Waves |
| Sub-Aperture 42 | -2.0 Waves |

Reference Sub-Aperture
Piston Position

Reference Sub-Aperture
Piston Position

METHOD FOR ALIGNING A PLURALITY OF SUB-APERTURES OF A MULTIPLE-APERTURE IMAGING SYSTEM

TECHNICAL FIELD

The present invention generally relates to a multiple-aperture imaging system and more particularly relates to a method for aligning a plurality of sub-apertures of a multiple-aperture imaging system.

BACKGROUND

Telescopes are increasingly being launched into space and operated outside of the Earth's atmosphere. The reason for this is that by positioning a telescope in space, the distorting effect of the Earth's atmosphere on light that is collected from distant objects can be reduced or eliminated altogether. As with a telescope that is mounted on the surface of the Earth, the resolution that is provided by a telescope that is mounted in space is directly related to the size of the primary mirror/collector (referred to herein as "an aperture") that is used to collect light from the distant object. The larger the aperture, the finer the resolution of the image that is obtained of the distant object.

This relationship between the size of the aperture and the resolution of the image creates a motivation to have the aperture of a space telescope be as large as possible. For example, it may be desirable to have an aperture that has a diameter that extends for dozens or hundreds of meters or more. A limiting factor on the size of the aperture of a space telescope is the current lift capability of modern spacecraft. It is not presently possible to launch an object into space having a diameter of dozens or hundreds of meters because modern spacecraft cannot accommodate a payload of that size.

One solution to this problem has been to design a space telescope having multiple apertures (referred to herein as "sub-apertures") that are positioned with respect to one another so as to behave like a single aperture. The sub-apertures can be connected to one another by structures and machinery that control the movement of each sub-aperture. Together, the sub-apertures, the structures that connect them to one another, and the machinery that controls their movement will be referred to herein as a multiple-aperture imaging system. There are many designs for multiple-aperture imaging systems, including segmented primary mirrors and multiple-telescope arrays. In many cases, a multiple-aperture imaging system can be reconfigured such that the sub-apertures may be arranged to form a condensed package that is compatible with the payload constraints of modern spacecraft. In this manner, a multiple-aperture imaging system that has a relatively large aperture can, nevertheless, be launched into space using a modern spacecraft.

Once the multiple-aperture imaging system arrives in space, it must be unpacked from the payload compartment of the spacecraft, unfolded, and then placed into an operational configuration with each sub-aperture positioned in its respective operational location. In order to function optimally, the sub-apertures must be very closely aligned with one another. Preferably, they will be positioned such that the reflective surfaces of the respective sub-apertures behave like a single aperture. In most cases, this requires that the reflective surfaces of the sub-apertures be aligned to within a small fraction of a reference wavelength of light.

Fine-alignment processes, such as phase retrieval or phase diversity, that permit the sub-apertures of a multiple-aperture imaging system to be aligned to within a small fraction of a reference wavelength of light are well known in the art. One such process, known as phase diversity, is described in "Joint estimation of object and aberrations by using phase diversity," Journal of the Optical Society A, Volume 9, July 1992, pages 1072-1085, by Paxman, et al. Phase diversity works very well to bring relatively closely aligned sub-apertures into very close alignment (i.e., within a small fraction of a reference wavelength of light), but it does not work well to bring sub-apertures from a highly unaligned state into very close alignment. Instead, other processes are utilized to move unaligned sub-apertures into a state of relatively close alignment (referred to as coarse alignment) before the phase-diversity process, or other such fine-alignment processes, can be implemented. These other coarse-alignment processes may entail sequentially aligning multiple pairs of sub-apertures in an iterative manner. Such methods are generally slow and time consuming It is desirable to bring the unaligned sub-apertures of a multiple-aperture imaging system into a state of relatively close alignment more quickly and/or more efficiently than current methods permit. Alternative coarse-alignment processes may require the use of additional hardware such as magnetic or interferometric sensors that operate between sub-apertures. It is desirable to reduce the number of such inter-subaperture sensors as well as the associated hardware complexity, weight, and cost. Alternative coarse-alignment processes may also have limits to the range of piston misalignments that they can sense. It is desirable to increase the range of piston misalignments that can be accommodated in coarse alignment.

BRIEF SUMMARY

Various embodiments of a method for aligning a plurality of sub-apertures of a multiple-aperture imaging system are disclosed herein.

In a first non-limiting embodiment, the method includes, but is not limited to, identifying one sub-aperture of the plurality of sub-apertures to serve as a reference sub-aperture. The method further includes actuating a piston associated with the reference sub-aperture in a series of piston steps of a substantially known amount. The method further includes collecting data relating to each image of a plurality of images of an object, each image corresponding to a respective piston step. The method further includes compiling the data, with a processor, into a three-dimensional data cube. The method further includes detecting, with the processor, a plurality of fringe patterns positioned within the three-dimensional data cube. The method further includes determining, with the processor, the relative location of each sub-aperture of the plurality of sub-apertures based on a location of each fringe pattern of the plurality of fringe patterns within the three-dimensional data cube. The method still further includes actuating a piston associated with at least one sub-aperture to move the at least one sub-aperture into alignment with another sub-aperture and repeating with each remaining sub-aperture until all sub-apertures are at substantially the same piston height.

In another non-limiting embodiment, the method includes, but is not limited to identifying one sub-aperture of the plurality of sub-apertures to serve as a reference sub-aperture. The method further includes actuating a piston associated with the reference sub-aperture in a first series of piston steps of a first substantially known amount. The method further includes collecting data relating to each image of a first plurality of images of an object, each image of the first plurality of images corresponding to a respective piston step of the first series of piston steps. The method further includes compiling the data relating to the first plurality of images, with a processor, into a three-dimensional data cube. The method further includes detecting, with the processor, a plurality of fringe patterns positioned within the three-dimensional data cube. The method further includes actuating a piston associated with the reference sub-aperture in a second series of piston steps of a second substantially known amount, the second series of piston steps occurring at positions corresponding with a location of the plurality of fringe patterns within the three-dimensional data cube, the second known amount being smaller than the first known amount. The method further includes collecting data relating to each image of a second plurality of images of the object, each image of the second plurality of images corresponding to a respective piston step of the second series of piston steps. The method further includes compiling the data relating to the second plurality of images, with the processor, into the three-dimensional data cube comprising both the first and second plurality of images. The method further includes detecting, with the processor, the plurality of fringes positioned within the three-dimensional data cube. The method further includes determining, with the processor, the relative location of each sub-aperture of the plurality of sub-apertures based on a location of each fringe pattern of the plurality of fringe patterns within the three-dimensional data cube. The method still further includes actuating a piston associated with at least one sub-aperture to move the at least one sub-aperture into alignment with another sub-aperture and repeating with each remaining sub-aperture until all sub-apertures are at substantially the same piston height.

In another non-limiting embodiment, the method includes, but is not limited to, combining an individual image of a point object from each sub-aperture of the plurality of sub-apertures to form an aggregated plurality of individual images of the point object. The method further includes determining a correspondence between each individual image of the aggregated plurality of individual images and each sub-aperture of the plurality of sub-apertures. The method further includes co-aligning all individual images of the aggregated plurality of images to form a stack of images of the point object, thus forming a single image of a point object. The method further includes identifying one sub-aperture of the plurality of sub-apertures to serve as a reference sub-aperture. The method further includes actuating a piston associated with the reference sub-aperture in a series of piston steps of a substantially known amount. The method further includes collecting data relating to each image of a plurality of images of the point object, each image corresponding to a respective piston step. The method further includes compiling the data, with a processor, into a three-dimensional data cube. The method further includes detecting, with the processor, a plurality of fringe patterns positioned within the three-dimensional data cube. The method further includes determining, with the processor, the relative location of each sub-aperture of the plurality of sub-apertures based on a location of each fringe pattern of the plurality of fringe patterns within the three-dimensional data cube. The method still further includes actuating a piston associated with at least one sub-aperture to move at least one sub-aperture into alignment with another sub-aperture and repeating with each remaining sub-aperture until all sub-apertures are at substantially the same piston height.

BRIEF DESCRIPTION OF THE DRAWINGS

The present invention will hereinafter be described in conjunction with the following drawing figures, wherein like numerals denote like elements.

DETAILED DESCRIPTION

Figure 1:
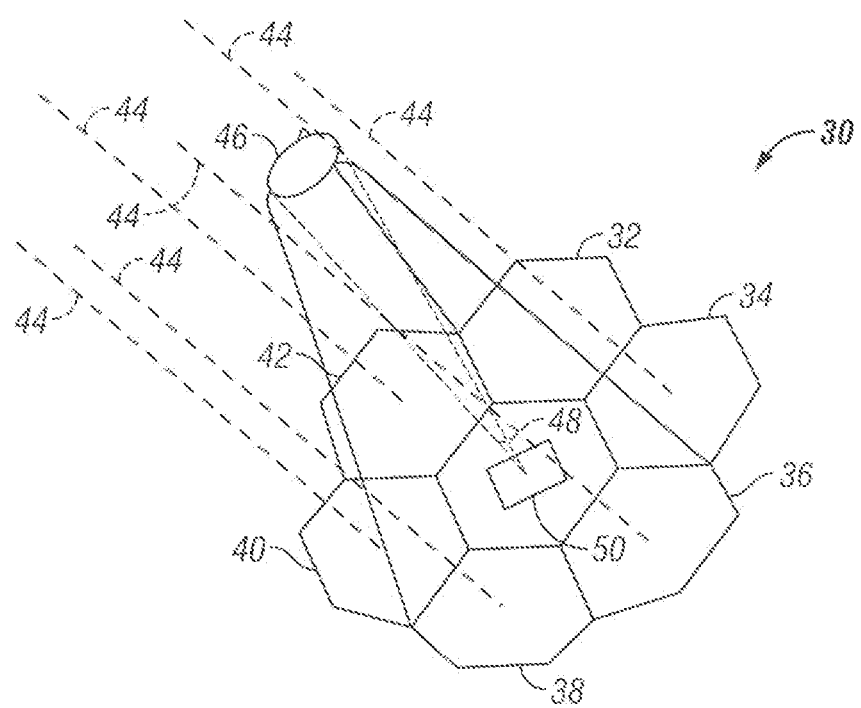
FIG. 1 is a schematic view of one type of multiple-aperture imaging system.

The following detailed description is merely exemplary in nature and is not intended to limit the invention or the application and uses of the invention. Furthermore, there is no intention to be bound by any theory presented in the preceding background or the following detailed description.

A new method for bringing the unaligned sub-apertures of a multiple-aperture imaging system into a state of relatively close alignment (this process is known as "extended capture") is disclosed herein. The method is applicable to both space-based and earth-based telescopes. The method entails designating one of the sub-apertures to serve as a reference sub-aperture and then moving the reference sub-aperture in a series of piston steps of a substantially known amount throughout a range of piston sweep. At each step in the series of piston steps, an image is captured of a distant broadband-light-producing unresolved object with a substantially known spectral distribution. It will be appreciated that in other embodiments, the object could be a localized or extended object. It should also be understood that the image may be acquired by a single focal plane or by multiple focal planes through the use of one or more beam splitters or other means. The image comprises an aggregation of the individual images reflected by each sub-aperture, including the reference sub-aperture, onto an image plane. Data will be collected relating to each captured image, including an identification of each piston step at which each corresponding image was captured. In this manner, each image can be correlated to a specific physical position of the reference sub-aperture as it moves through the range of piston sweep.

As the reference sub-aperture moves through the range of piston sweep, it will move into and out of relatively close alignment with each of the other sub-apertures, one sub-aperture at a time. When the reference sub-aperture begins to come into relatively close alignment with one of the other sub-apertures, the broadband light that is being reflected off of the reference sub-aperture will begin to interfere with the broadband light that is being reflected off of the relatively closely aligned sub-aperture. The interference between the reflected light from the reference sub-aperture and the reflected light from the relatively closely aligned sub-aperture will manifest as fringes on the image plane. A two-dimensional fringe pattern may appear as a series of parallel fringes on the image plane.

The clarity and definition of the fringes will correlate with the alignment between the reference sub-aperture and the other sub-aperture. As the reference sub-aperture and the other sub-aperture become more closely aligned, the clarity and definition of the fringes will increase. Thus, when the fringes are observed to have the greatest clarity and definition, the reference sub-aperture and the other sub-aperture are in a state of relatively close alignment.

The fringes resulting from the interference between the reference sub-aperture and the other sub-aperture will have an orientation that corresponds with the sub-aperture that is relatively closely aligned with the reference sub-aperture. The orientation of the fringes will be based on the lateral position of the specific sub-aperture in the subaperture array with respect to the reference sub-aperture in that same array. From this relationship, the orientation of each fringe can be predicted using computer modeling techniques that are well known in the art.

Accordingly, as the reference sub-aperture steps through the piston-sweep range, it will move into, and out of, relatively close alignment with each of the other sub-apertures. Such relatively close alignment will manifest as a series of fringes on the image plane, each fringe having a unique orientation corresponding to a particular sub-aperture. Data relating to each image obtained at each step through the piston-sweep range is collected and stored. The data will include information relating to the clarity and definition of each fringe, the orientation of each fringe, and the specific step(s) of the piston-sweep range where each fringe pattern was detected. Using a processor, the data may be compiled into a three-dimensional model (referred to herein as a three-dimensional cube). The location of each fringe pattern within the three-dimensional cube and the orientation of each fringe can be determined using the processor. The location correlates with, and is indicative of, the physical location within the piston-sweep range of a specific sub-aperture of the multiple-aperture imaging system. Using the processor, a specific sub-aperture can be correlated with each fringe pattern based on the orientation of the fringe pattern. From this, the relative position of each sub aperture of the multiple-aperture imaging system can be determined.

Once the relative position of each aperture of the multiple-aperture imaging system has been determined, a piston associated with each sub-aperture can be actuated to move each sub-aperture an appropriate distance that will bring each sub-aperture into relatively close alignment with all of the other sub-apertures.

A greater understanding of the embodiments of the method for aligning the sub-apertures of a multiple-aperture imaging system may be obtained through a review of the illustrations accompanying this application together with a review of the detailed description that follows.

FIG. 1 is a schematic view of an example of a multiple-aperture imaging system 30 positioned in space. In some embodiments, a multiple-aperture imaging system 30 may be deployed in orbit around the Earth. In other embodiments, multiple-aperture imaging system 30 may be deployed in a manner such that multiple-aperture imaging system 30 is flying through space towards a target or destination. In still other embodiments, multiple-aperture imaging system 30 may be deployed in any other suitable manner and at any other suitable location outside of or inside of the Earth's atmosphere, including on airborne or earth-based platforms.

Multiple-aperture imaging system 30 includes a plurality of sub-apertures. In the illustrated embodiment, multiple-aperture imaging system 30 includes six sub-apertures including a sub-aperture 32, a sub-aperture 34, a sub-aperture 36, a sub-aperture 38, a sub-aperture 40, and a sub-aperture 42. In other embodiments, multiple-aperture imaging system 30 may have as little as two sub-apertures or as many sub-apertures as desired. Multiple-aperture imaging system 30 is configured such that each sub-aperture is positioned adjacent to one another to form a generally contiguous aggregated aperture (or filled aperture). In other embodiments, the discrete sub-apertures may be positioned remotely from one another to form a sparse aperture. Additionally, although multiple-aperture imaging system 30 is illustrated as having a generally circular configuration, the teachings herein are compatible with a multiple-aperture imaging system having virtually any configuration. Furthermore, multiple-aperture imaging systems can consist of multiple-telescope arrays of many configurations, wherein the light from multiple telescopes are brought together with a combiner telescope so that the array of telescopes operate in concert as a single telescope.

From the perspective shown in FIG. 1, only a reflective surface of each sub-aperture is illustrated. Positioned below each reflective surface, each sub-aperture also includes a housing, any machinery necessary to control the movement of each sub-aperture, and hardware necessary to secure each sub-aperture to a frame, mount or superstructure.

Also illustrated in FIG. 1 are rays of broadband light (referred to hereinafter as "light 44") emanating from a distant object (not shown) such as a star. Light 44 strikes the reflective surface of each sub-aperture and is reflected to a collecting reflector (secondary mirror) 46 which, in turn, reflects the collected light in an aggregated light beam 48 to an image plane 50. The term light refers to electromagnetic radiation. Depending upon the telescope design, this could be in the infrared, the visible, the ultraviolet, or any other region of the electromagnetic spectrum. Image plane 50 is operatively connected to an imaging detector and a processor (not shown) which is configured to convert the image projected onto image plane 50 into electronic data for storage.

Additionally, although multiple-aperture imaging system 30 is illustrated as having a relatively simple optical design with a single secondary mirror, multiple-aperture imaging systems can have a wide variety of design with additional optical elements, such as tertiary mirrors, folding optics, reimaging optics, etc. Furthermore, other embodiments involve beam splitters and multiple imaging detectors.

Figure 2:
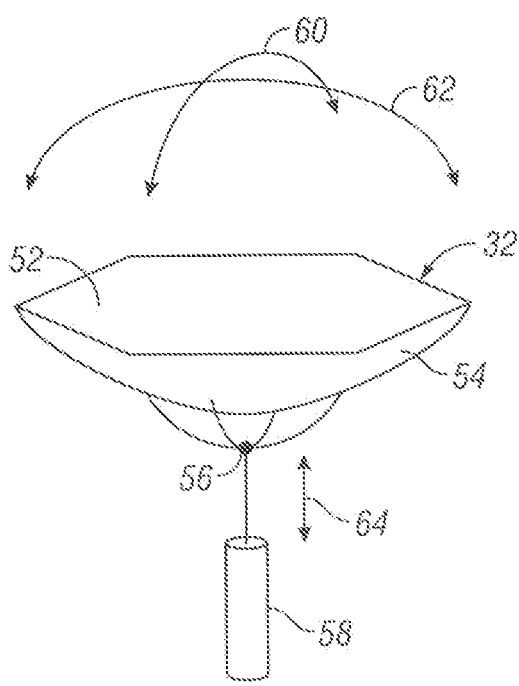
FIG. 2 is a schematic view of a single sub-aperture of the multiple-aperture imaging system of FIG. 1.

FIG. 2 is a schematic view of sub-aperture 32. It should be understood that the discussion of sub-aperture 32 in conjunction with FIG. 2 is merely exemplary in nature and that the details described with respect to sub-aperture 32 are equally applicable to sub-apertures 34 through sub-aperture 42.

Sub-aperture 32 includes a reflective surface 52, a housing 54, a tip/tilt mount 56, and a piston mount 58 (the term "piston mount" and the term "piston" shall be used interchangeably herein). With continuing reference to FIG. 1, reflective surface 52 comprises a mirror that is used to reflect light from an object being viewed onto collecting reflector 46. In the illustrated embodiment, housing 54 serves as a base to support reflective surface 52 and also provides an enclosure for machinery and other structures. In some embodiments, housing 54 may also enclose tip/tilt mount 56 and/or piston mount 58.

Tip/tilt mount 56 is configured to permit rotational adjustment of sub-aperture 32 about two perpendicular axes in the directions indicated by arrows 60 and 62. As discussed below, tip/tilt mount 56 may be used to move an image reflected by reflective surface 52 into alignment with the images reflected by the respective reflective surfaces of each of the other sub-apertures.

Piston mount 58 is configured to facilitate adjustment of reflective surface 52 in an up-and-down direction as indicated by arrow 64. In this manner, piston mount 58 can be used to move reflective surface 52 towards and/or away from the source of light being reflected by reflective surface 52. In some embodiments, piston mount 58 is capable of exceedingly small movements such as movements on the order of a small fraction of a reference wavelength of light. It should be appreciated that in other embodiments of multiple-aperture imaging systems the control of piston, tip, and tilt can be accomplished by other means including the use of adjustable optical-path delay devices and separate tip and tilt mirrors.

Figure 3:
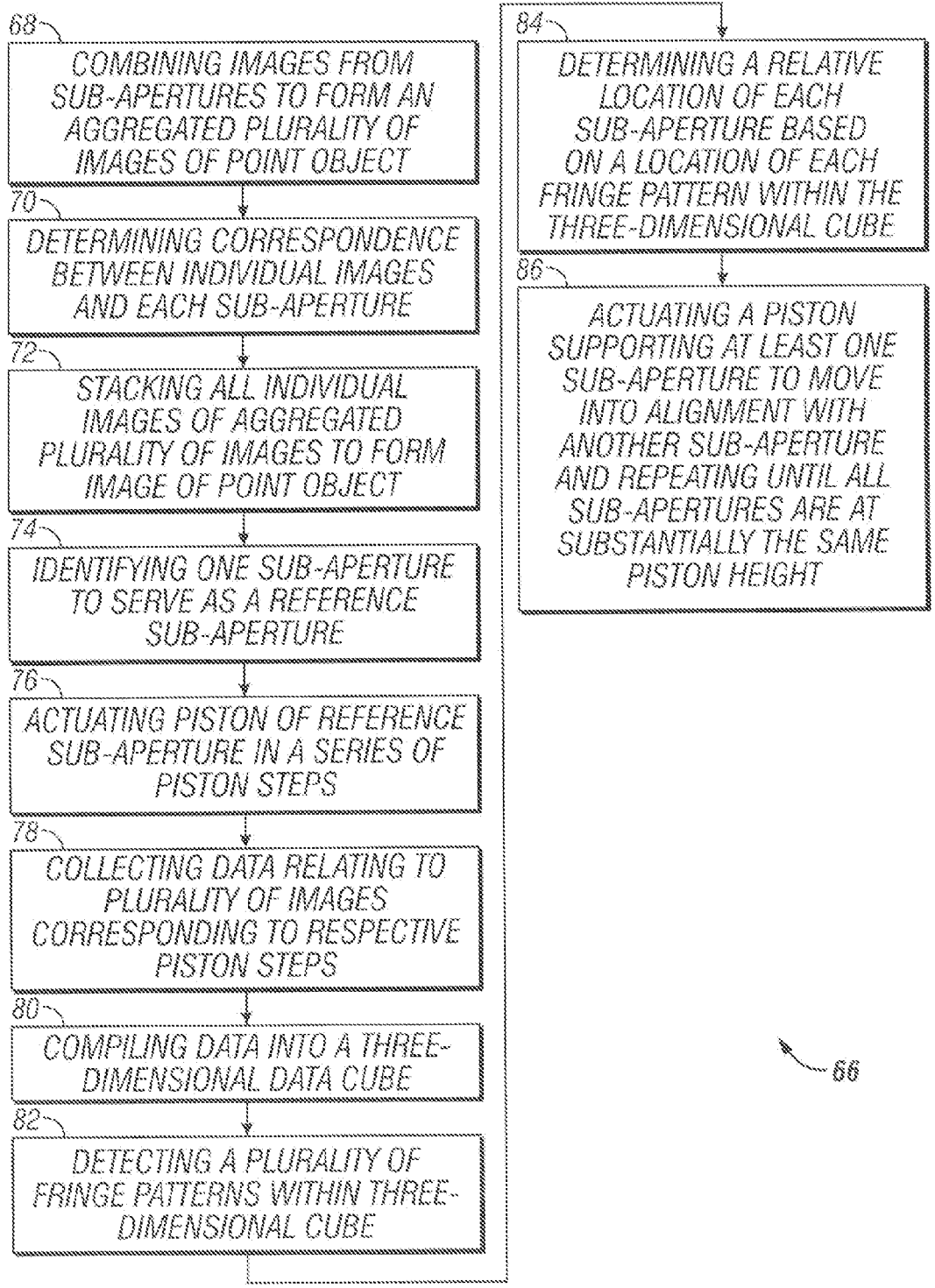
FIG. 3 is a block diagram illustrating an embodiment of a method for aligning a plurality of sub-apertures of a multiple-aperture imaging system.
Figure 5:
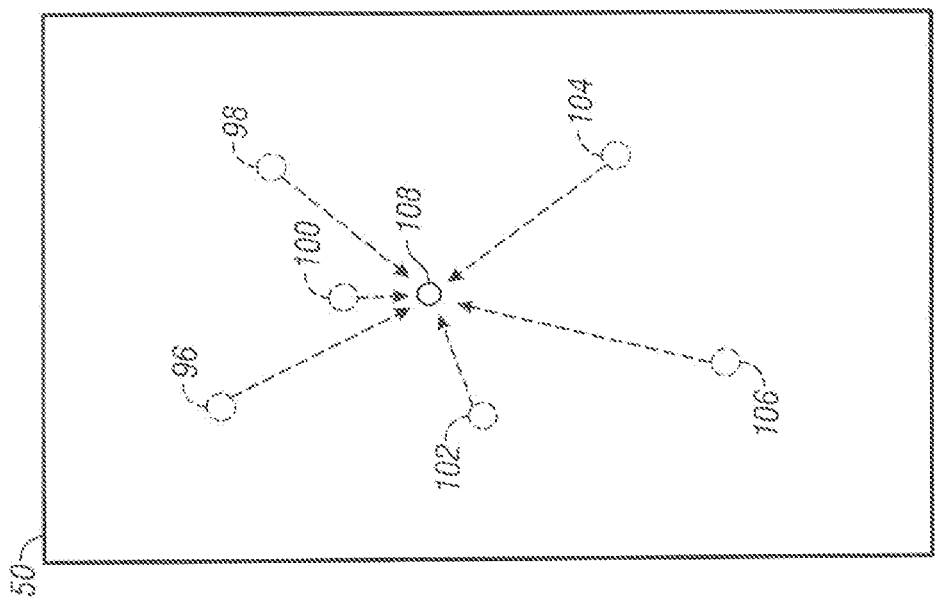
FIG. 5 is an exemplary schematic image collected by the multiple-aperture imaging system of FIG. 1 subsequent to tip and tilt alignment of the sub-apertures.

As set forth above, sub-aperture 34 through sub-aperture 42 are each configured substantially as set forth above with respect to sub-aperture 32. By coordinating the actuation of the respective tip/tilt mounts of each of the sub-apertures, the multiple images of a distant object reflected by the reflective surfaces of the sub-apertures can be co-aligned to provide a single relatively bright image of the distant object. By coordinating the actuation of the respective piston mounts of each of the sub-apertures, the reflective surfaces of each sub-aperture can be positioned such that their distance from the distant object is substantially the same (i.e., to within a small fraction of a reference wavelength of light). By positioning the respective reflective surfaces of each of the sub-apertures such that they are aligned to within a small fraction of a reference wavelength of light, the disparate sub-apertures collectively behave like a single aperture, yielding a much sharper image of the distant object FIG. 3 is a block diagram illustrating an embodiment of a method 66 for aligning a plurality of sub-apertures of a multiple-aperture imaging system during the extended-capture phase of alignment of the sub-apertures. With continuing reference to FIGS. 1-2, at block 68, each sub-aperture of the multiple-aperture imaging system reflects broadband light emanating from a distant point object (e.g., a star). The reflection from each sub-aperture is combined on an image plane of the multiple-aperture imaging system. The image plane is configured to capture an image of the distant object and to convert the image to electronic data. Because the sub-apertures are not aligned at the beginning stage of the extended capture phase, the image captured on the image plane will show multiple disparate images of the distant point object. The appearance of multiple disparate images of the distant point object on the image plane will be referred to herein as an "aggregated plurality of individual images" of the distant point object and will be given the reference number 95 for ease of reference.

Figure 4:
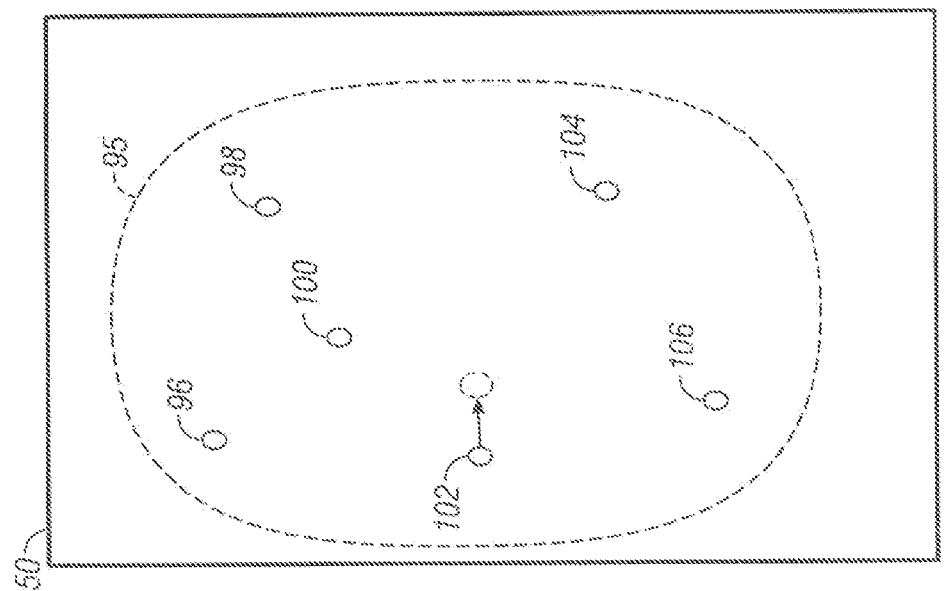
FIG. 4 is an exemplary schematic image collected by the multiple-aperture imaging system of FIG. 1 of a distant object prior to tip and tilt alignment of the sub-apertures.

Aggregated plurality of individual images 95 is illustrated in FIG. 4. Aggregated plurality of individual images 95 includes six disparate images 96-106, each being depicted on image plane 50. In other embodiments where the multiple-aperture imaging system includes a greater or smaller number of sub-apertures than are depicted in FIG. 1, there would be a correspondingly greater or smaller number of disparate images reflected onto image plane 50.

At block 70 of method 66, illustrated in FIG. 3, the correspondence of each disparate image of aggregated plurality of individual images 95 to a respective sub-aperture is determined This may be accomplished in many ways. In one example, the tip/tilt mount of each sub-aperture is actuated, one at a time, in either a tip or tilt direction. Image plane 50 is observed during such actuation to determine which disparate image of the aggregated plurality of individual images moves. For example, with continuing reference to FIGS. 1-4, when the tip/tilt mount of sub-aperture 38 is actuated, disparate image 102 can be observed moving towards the right in image plane 50. From this, it can be concluded that disparate image 102 is being reflected by sub-aperture 38. This process is repeated for each of the sub-apertures until all of the disparate images have been correlated to a respective sub-aperture.

At block 72 of method 66, illustrated in FIG. 3, once the correspondence between each sub aperture and each disparate image has been established, the tip/tilt mount of each sub-aperture is actuated in a manner that repositions each disparate image to a single location on image plane 50, thus stacking the images one on top of another to provide a single, relatively bright combined image referred to herein as image 108.

At this point in method 66, each sub-aperture has been repositioned to form a single, relatively bright image on image plane 50. What remains now is to adjust the piston height of each sub-aperture such that they are aligned to within a small fraction of a reference wavelength of one another. At block 74, one of the sub-apertures is selected to serve as a reference sub-aperture. As discussed in detail below, the piston mount of the reference sub-aperture will be actuated in a manner that causes the reference sub-aperture to step through a range of piston sweep in an effort to determine the relative location of each of the remaining sub-apertures.

Figure 6:
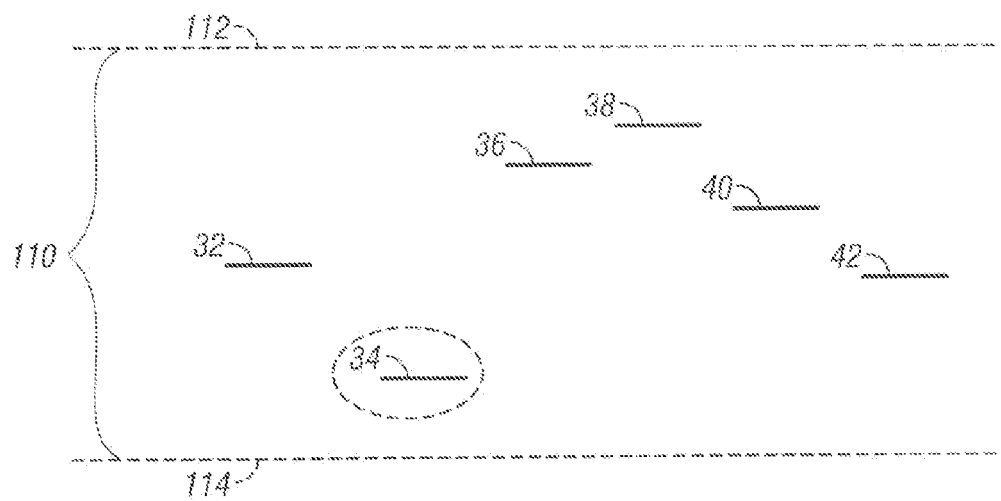
FIG. 6 is a schematic side view illustrating the relative height of each sub-aperture of the multiple-aperture imaging system prior to implementation of the piston-alignment method disclosed herein.

With continuing reference to FIGS. 1-5, FIG. 6 schematically depicts the relative heights of the reflective surfaces at the center of all six of the sub-apertures of multiple-aperture imaging system 30. For purposes of illustration only, the six sub-apertures of multiple-aperture imaging system 30 have been arranged in a line starting with sub-aperture 32 on the left and continuing through sub-aperture 42 on the right. A piston-sweep range 110 is also identified in FIG. 6. Piston-sweep range 110 represents the distance between an upper limit 112 and a lower limit 114 of movement of the respective piston mount for each sub-aperture. FIG. 6 is a schematic view and the vertical distance between the individual sub-apertures has been greatly exaggerated for illustration purposes only. The range of heights of the reflective surfaces of each of the subapertures will depend on the design of the multiple-aperture telescope and its deployment. In an exemplary use case, the heights of the reflective surfaces of each of the sub-apertures may vary by several dozen reference wavelengths of light and the piston-sweep range may extend for distance of 100-200 light wavelengths.

In FIG. 6, sub-aperture 34 has been selected to serve as the reference sub-aperture. The selection of a sub-aperture to serve as a reference sub-aperture may be based on the location of the sub-aperture within piston-sweep range 110. For example, it may be desirable to select a sub-aperture that is located at a piston height that is closest to either upper limit 112 or lower limit 114. Any other desirable selection strategy may also be employed.

At block 76 of method 66, illustrated in FIG. 3, the piston associated with the reference sub aperture (sub-aperture 34) is actuated so as to move the reference sub-aperture through a series of piston steps within piston-sweep range 110. With continuing reference to FIGS. 1-7, the series of piston steps shall comprise sequential stepped movements of the piston associated with the reference sub-aperture with a pause at each step. Each piston step shall move the reflective surface of the reference sub-aperture progressively towards (or away from) the distant point object by a known amount. An image of the distant point object is captured by multiple-aperture imaging system 30 during the pause at each step which, in turn, yields a plurality of images. Each image can be correlated to a specific step of the piston mount within piston-sweep range 110 and because each step of the series of piston steps has a known length, each image can be correlated to a specific vertical position within piston-sweep range 110.

At block 78 of method 66, illustrated in FIG. 3, data is collected corresponding to each image of the plurality of images that are collected during the series of piston steps. The occurrence of the piston steps and the collection of data occur contemporaneously. The data may be stored in any conventional manner, such as on a hard drive or on any other suitable means for storing electronic data. The data may include information pertaining to the image that was captured at each piston step as well as the location (vertical position) within piston-sweep range 110 where such image was captured.

Figure 7:
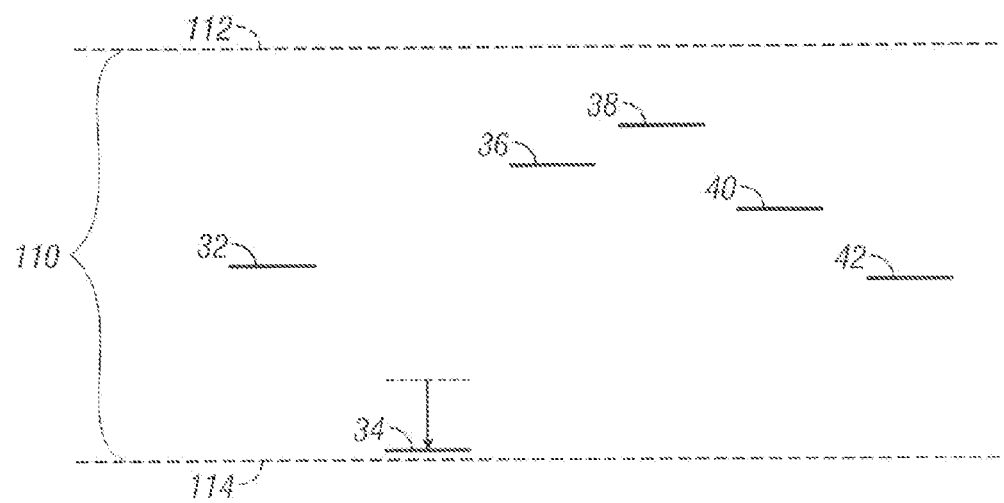
FIG. 7 is a schematic side view similar to FIG. 6 illustrating movement of a reference sub-aperture to a position located at an end of its piston-sweep range.
Figure 8:
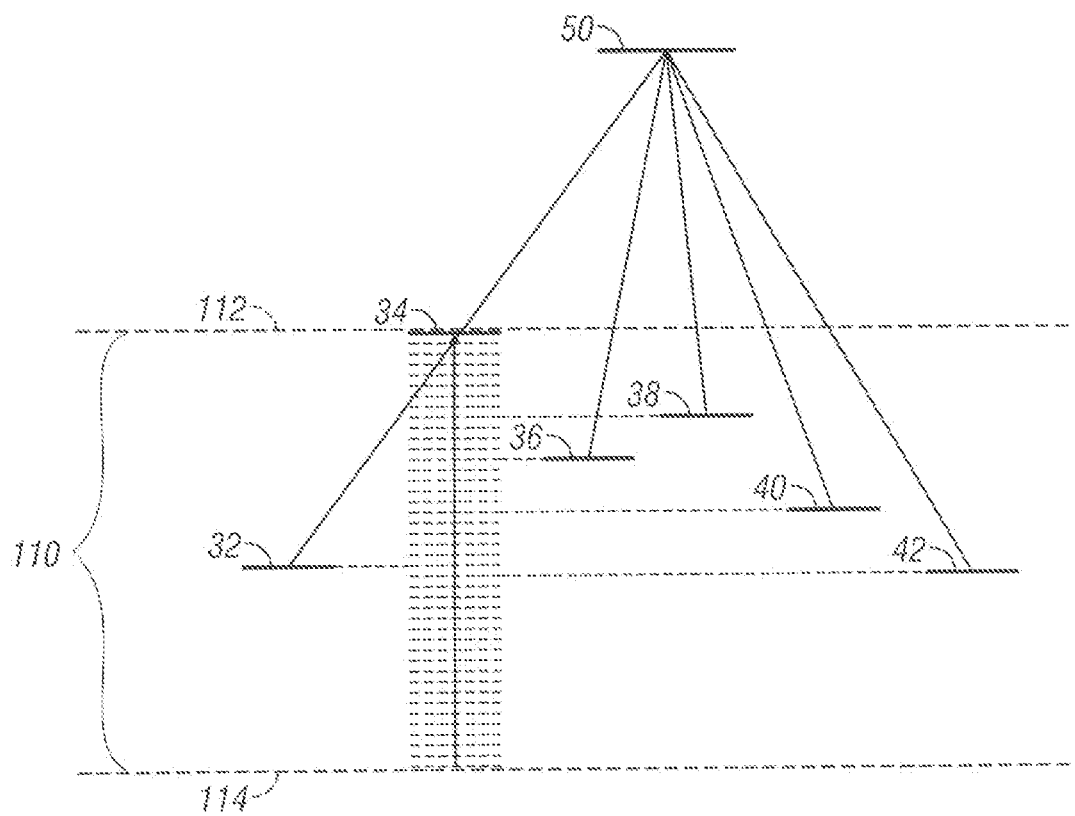
FIG. 8 is a schematic side view similar to FIG. 7 illustrating movement of the reference sub-aperture in a series of piston steps through its entire piston-sweep range to collect data corresponding with an image of a point object with known spectral distribution obtained at each piston step.

FIGS. 7 and 8 illustrate the series of piston steps. With respect to FIG. 7, the reference sub-aperture (sub-aperture 34) is moved to lower limit 114 of piston-sweep range 110 prior to beginning the series of piston steps. This initial movement to the bottom (or to the top) of the piston-sweep range is appropriate in instances where the series of piston steps will extend throughout the entire piston-sweep range. In other embodiments where a different strategy is employed for the conduct of the series of piston steps, the reference sub-aperture may be moved to a different location within piston-sweep range 110.

With respect to FIG. 8, the reference sub-aperture (sub-aperture 34) is moved in step increments throughout piston-sweep range 110 starting at lower limit 114 and continuing to upper limit 112. Throughout the period of time that the reference sub-aperture is moved through the series of piston steps, each of the remaining sub-apertures is held stationary. As described above, each of the remaining sub-apertures have been positioned so as to reflect light emanating from the distant point object onto a single location on image plane 50. At each step of the series of piston steps, an image of the distant point object is captured on image plane 50 and data relating to each image is obtained and stored for later processing.

As the reference sub-aperture moves incrementally throughout piston-sweep range 110, it will come into relatively close alignment with each of the remaining sub-apertures, one at a time. Such relatively close alignment will cause the light reflecting off of the reference sub-aperture to interfere with the light reflecting off of the relatively closely aligned sub-aperture. This interference will manifest as a two-dimensional fringe pattern on image plane 50. As the reference sub-aperture approaches another sub-aperture, the fringe pattern will begin to appear. As the reference sub-aperture moves closer, the fringe pattern becomes clearer and more well-defined. After the reference sub-aperture moves past the sub-aperture, the fringe pattern will begin to diminish. When the reference sub-aperture has moved far enough past the sub-aperture, the fringe pattern will no longer be visible. Accordingly, as the reference sub-aperture moves throughout piston-sweep range 110, there will be five instances of relatively close alignment and five occurrences of well-defined two-dimensional fringe patterns, one for each of the sub-apertures that remain stationary as the reference sub-aperture sweeps through piston-sweep range 110.

At block 80 of method 66, illustrated in FIG. 3, the data relating to each image collected during the series of piston steps is compiled into a three-dimensional data cube. As used herein, the term "three-dimensional data cube" refers to a computer construct wherein the data relating to each of the images obtained during the series of piston steps is organized sequentially which enables the definition of a three-dimensional fringe pattern. The three-dimensional fringe pattern, associated with the interference of light from a given sub-aperture and that of the reference sub-aperture, consists of the sequence of two-dimensional fringe patterns obtained as the reference sub-aperture moves through a sequence of piston steps in relatively close proximity to the given sub-aperture. Thus the three-dimensional fringe pattern is a sequence of two-dimensional fringe patterns as the two-dimensional fringe patterns begin to appear, as they become clearer and more well-defined, and as they begin to diminish by virtue of the sequence of piston steps. Although the three-dimensional data cube is conceptually useful, it will be appreciated that the data need not be physically organized into a cube format.

Figure 9:
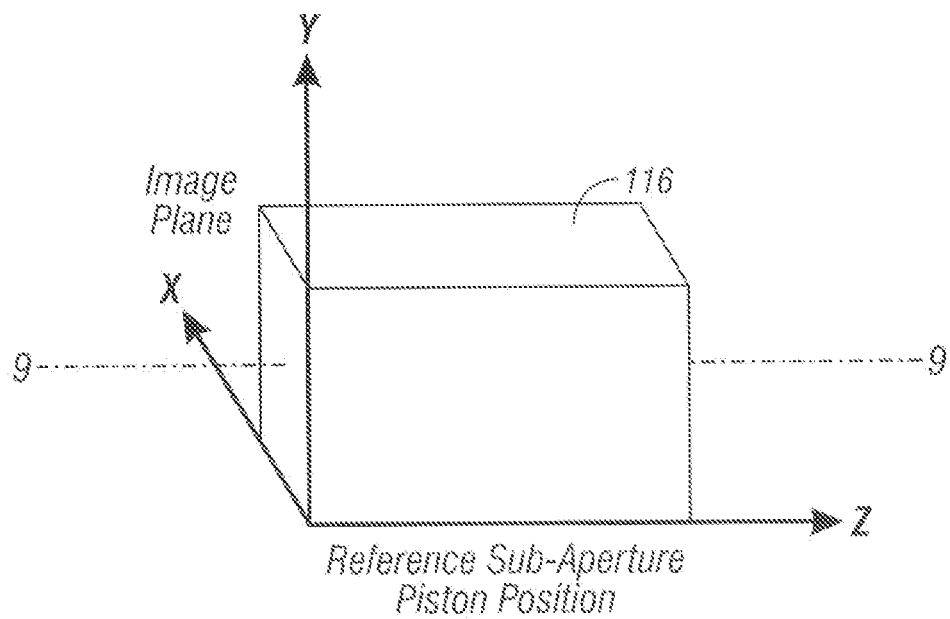
FIG. 9 is a schematic representation of a three-dimensional data cube compiled using the data collected during the sweep of the reference sub-aperture through its entire piston range.

FIG. 9 illustrates an exemplary three-dimensional data cube 116 containing data relating to the images that were collected during the series of piston steps depicted in FIG. 8. By using the data contained in three-dimensional data cube 116, the three-dimensional fringe patterns can be detected and their relative locations can be determined The X axis corresponds to the height of the piston relative to piston-sweep range 110, and the Y and the Z axes define the plane in which the image of the distant point object was captured.

Figures 10, 11:
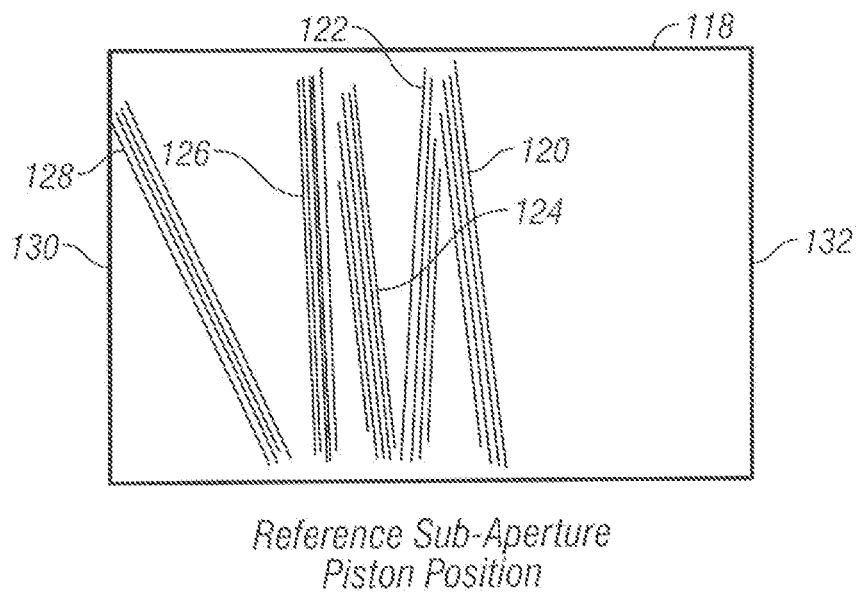
FIG. 10 is a representation of a cross section of the three-dimensional cube obtained by passing a vertical plane extending parallel to line 9-9 through the three-dimensional cube, the cross section illustrating multiple fringe patterns indicative of interference of light reflected by the reference sub-aperture and each of the other sub-apertures.
FIG. 11 is a chart numerically illustrating the deviation in piston position of several of the sub-apertures from another of the sub-apertures.

At block 82 of method 66, illustrated in FIG. 3, a processor is used to detect each fringe pattern from the data stored in three-dimensional data cube 116 of FIG. 9. By determining the position of each three-dimensional fringe pattern within three-dimensional data cube 116, the processor can determine the relative position of each sub-aperture within piston-sweep range 110 and the relative position of each sub-aperture with respect to one another. FIG. 10 is a representation of a cross section 118 of three-dimensional data cube 116. This cross section is presented for tutorial purposes only and need not be explicitly constructed in the processing sequence. From a conceptual standpoint, cross-section 118 may be obtained by passing a vertically oriented plane through three-dimensional data cube 116 along line 9-9. Cross-section 118 illustrates the cross section of five three-dimensional fringe patterns (fringe pattern 120, fringe pattern 122, fringe pattern 124, fringe pattern 126, and fringe pattern 128) which are indicative of interference between light reflected off of the reference sub-aperture and light reflected off of each of the other sub-apertures. The distance of the center of each fringe pattern from end 130 and/or from end 132 of cross-section 118 corresponds with the location of each sub-aperture (other than the reference sub-aperture) with respect to piston-sweep range 110. Whereas the two-dimensional cross section 118 is useful for tutorial purposes, processing is performed on the entire three-dimensional data cube.

At block 84 of method 66, illustrated in FIG. 3, a processor is used to determine a relative location of each sub-aperture based on the pattern and the location of each fringe pattern within three-dimensional data cube 116. Each fringe pattern may be correlated with a respective sub-aperture. Each sub-aperture, by virtue of its lateral position within the sub-aperture array position and its orientation with respect to the reference sub-aperture, will cause the resulting fringe pattern to have a unique orientation. These unique orientations can be determined in advance through the use of computer modeling. Such computer-model patterns with identifying orientations can be used as a template to search for and detect the same fringe orientation from among the fringes within the data cube. Once a match is been made, the matched fringe pattern can be correlated to a specific sub-aperture.

The data included in three-dimensional data cube 116 can also be used to determine the location of each sub-aperture. The data in three-dimensional data cube 116 can be used to determine where each three-dimensional fringe pattern has the greatest clarity and definition, typically at the center of the fringe pattern. Once the location of greatest clarity and definition has been determined for each fringe pattern, that location can be used to determine the position of each fringe within the three-dimensional data cube. This, in turn, permits the processor to determine the relative location of each sub-aperture with respect to piston-sweep range 110 and also with respect to one another.

At block 86 of method 66, illustrated in FIG. 3, the piston associated with at least one of the sub-apertures is actuated to cause the at least one sub-aperture to move into alignment with another sub-aperture. This process is repeated with each of the remaining sub-apertures until all sub-apertures are positioned at substantially the same piston height (i.e., until all sub-apertures are relatively closely aligned). It should be noted that the alignment of each sub-aperture need not be done sequentially. Rather, all pistons associated with all sub-apertures may be actuated contemporaneously to bring the sub-apertures into relatively close alignment at substantially the same time. Once all of the sub-apertures are in relatively close alignment with one another, other fine-alignment processes, involving for example phase retrieval or phase diversity, may be employed to further reposition the sub-apertures such that their respective reflective services are aligned to within a small fraction of a reference wavelength of light.

Several strategies may be employed when performing the steps of determining the relative positions of each sub-aperture and of actuating the pistons associated with each sub-aperture to bring the sub-apertures into relatively close alignment, as described in block 84 and 86. For example, in some embodiments it may be desirable to align all of the sub-apertures at a piston height where one of the sub-apertures is currently positioned. Employing such a strategy would result in determining the location of five sub-apertures with respect to a sixth sub-aperture and then moving the five sub-apertures into alignment with the sixth sub-aperture. The strategy is depicted in FIGS. 11 and 12.

With continuing reference to FIGS. 1-10, FIG. 11 depicts a chart 134. In the left column of chart 134, each of the sub-apertures of multiple-aperture imaging system 30 whose position was detected by the reference sub-aperture during the piston sweep is identified. In the right column of chart 134, a distance is indicated (in units of number of wavelengths at a reference wavelength of light) corresponding to each sub-aperture identified in the left column. In this example, sub-aperture 36, sub-aperture 38, sub-aperture 40, and sub-aperture 42 will each be aligned with sub-aperture 32. Accordingly, the distances shown in the right column are distances between each of the indicated sub-apertures and sub-aperture 32. For example, the reflective surface of sub-aperture 38 is located 5.5 wavelengths from the reflective surface of sub-aperture 32. In this example, sub-aperture 32 has been selected as a base for determining the relative position of each of the other sub-apertures because, as illustrated in FIG. 6, sub-aperture 32 is relatively close to an approximate center of piston-sweep range 110. In other examples, any of the other sub-apertures may be selected to serve as a base sub-aperture for aligning the remaining sub-apertures.

Figures 12, 13:
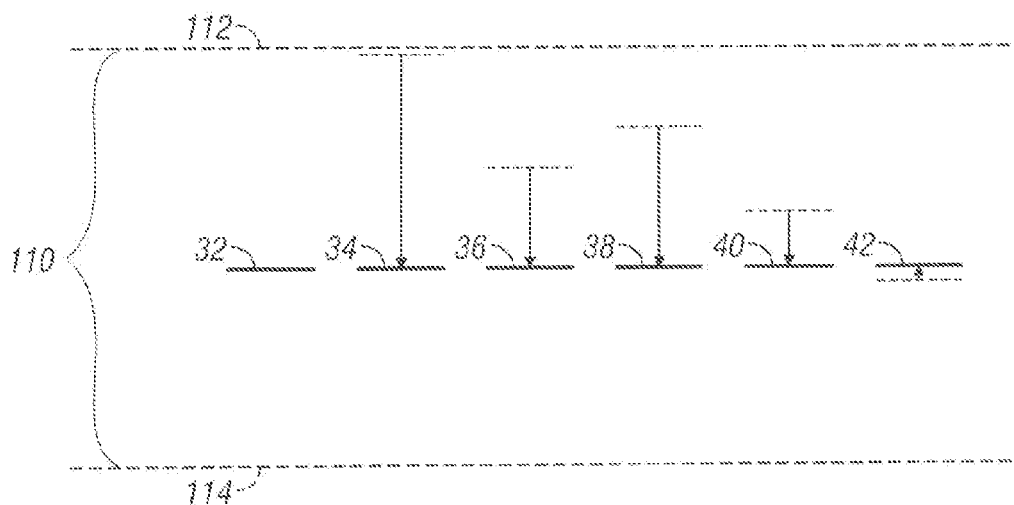
FIG. 12 is a schematic side view similar to FIG. 6 illustrating movement of each sub-aperture to substantially the same piston height.
FIG. 13 is a chart numerically illustrating the deviation in piston of each sub-aperture from an approximate center of the piston-sweep range.

FIG. 12 illustrates the movement of each sub-aperture from the position shown in FIG. 8 into a position that is relatively closely aligned with sub-aperture 32. As illustrated, sub-aperture 32 remains static while each of the remaining sub-apertures is moved into alignment with sub-aperture 32. Sub-aperture 34, which was selected as the reference sub-aperture is also moved into alignment with sub-aperture 32. The position of sub-aperture 34 with respect to sub-aperture 32 is known as a result of the series of piston steps undertaken by sub-aperture 34.

Another strategy that may be employed when performing the method steps depicted in block 84 and 86 of method 66 entails repositioning all of the sub-apertures to an approximate center of piston-sweep range 110. The strategy is depicted in FIGS. 13 and 14.

With continuing reference to FIGS. 1-10, FIG. 13 depicts a chart 136. In the left column of chart 136, each of the sub-apertures of multiple-aperture imaging system 30 whose position was detected by the reference sub-aperture during the piston sweep is identified. In the right column of chart 136, a distance is indicated corresponding to each sub-aperture identified in the left column. In this example, sub-aperture 32, sub-aperture 36, sub-aperture 38, sub-aperture 40, and sub-aperture 42 will each be aligned at an approximate center of piston-sweep range 110. Accordingly, the distances shown in the right column are distances between each of the indicated sub-apertures and the approximate center of piston-sweep range 110. For example, the reflective surface of sub-aperture 38 is located 5.0 reference wavelengths from the approximate center of piston-sweep range 110. In other examples, any position within piston-sweep range 110 may be selected to serve as the location where all of the sub-apertures are aligned.

Figures 14, 15:
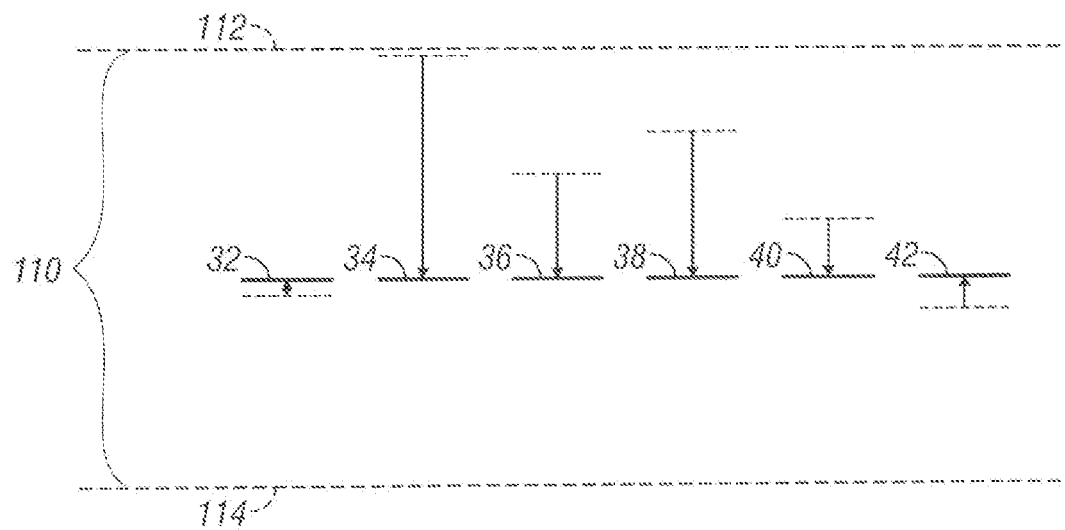
FIG. 14 is a schematic side view similar to FIG. 12 illustrating movement of each sub-aperture to substantially the same piston height at the approximate center of the piston-sweep range.
FIG. 15 is a chart numerically illustrating the deviation in piston of each sub-aperture from an approximate center of all of the sub-apertures.

FIG. 14 illustrates the movement of each sub-aperture from the position shown in FIG. 8 into a position that is relatively closely aligned with a center point of piston-sweep range 110. Sub-aperture 34, which was selected as the reference sub-aperture is also moved into alignment at the approximate center point of piston-sweep range 110. The position of sub-aperture 34 with respect to the approximate center point of piston-sweep range 110 is known as a result of the series of piston steps undertaken by sub-aperture 34.

Another strategy that may be employed when performing the method steps depicted in block 84 and 86 of method 66 entails repositioning all of the sub-apertures to an approximate center point of all of the current piston positions. The strategy is depicted in FIGS. 15 and 16.

With continuing reference to FIGS. 1-10, FIG. 15 depicts a chart 138. In the left column of chart 138, each of the sub-apertures of multiple-aperture imaging system 30 whose position was detected by the reference sub-aperture during the piston sweep is identified. In the right column of chart 138, a distance is indicated corresponding to each sub-aperture identified in the left column. In this example, sub-aperture 32, sub-aperture 36, sub-aperture 38, sub-aperture 40, and sub-aperture 42 will each be aligned at an approximate center of their current piston positions. This strategy has the advantage of distributing the movement as evenly as possible among all sub-apertures. Accordingly, the distances shown in the right column are distances between each of the indicated sub-apertures and the approximate center point of the sub-apertures. For example, the reflective surface of sub-aperture 38 is located 2.6 reference wavelengths from the approximate center point of the sub-apertures.

Figure 16:
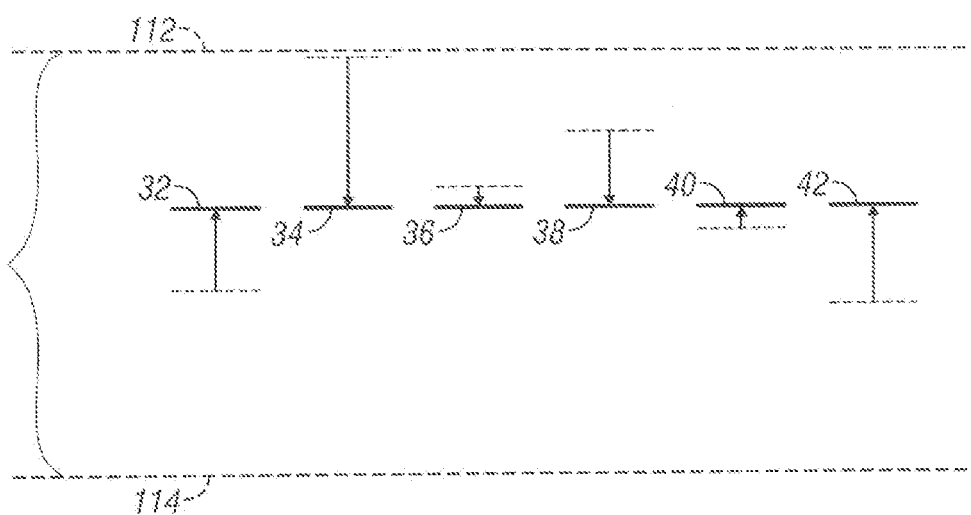
FIG. 16 is a schematic side view similar to FIG. 11 illustrating movement of each sub-aperture to substantially the same piston height at the approximate center of all of the sub-apertures.

FIG. 16 illustrates the movement of each sub-aperture from the position shown in FIG. 8 into a position that is relatively closely aligned with a center point of the sub-apertures.

Figure 17:
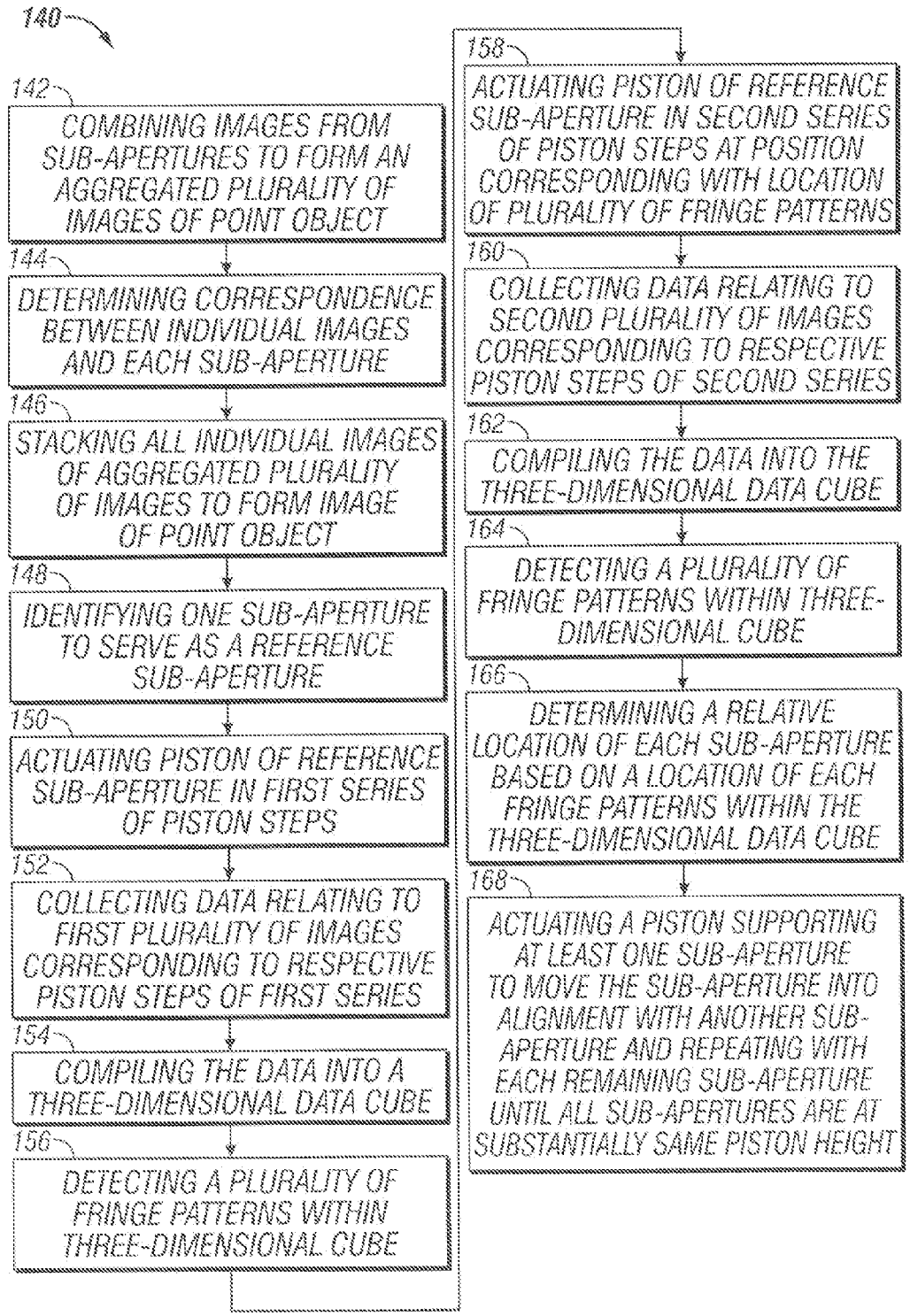
FIG. 17 is a block diagram illustrating another embodiment of a method for aligning a plurality of sub-apertures of a multiple-aperture imaging system.

FIG. 17 is a block diagram illustrating another embodiment of a method for aligning a plurality of sub-apertures of a multiple-aperture imaging system. With continuing reference to FIGS. 1-16, the primary distinction between method 66, described above, and method 140, described below is that method 140 entails an iterative series of piston steps intended to rapidly locate the fringes and then to focus on only the regions of the piston-sweep range that are in the neighborhood of the locations of the sub-apertures. In this manner, method 140 may consume less time the method 66.

The method steps described in blocks 142-156 and blocks 166-168 of method 140, illustrated in FIG. 17 are substantially identical to the method steps performed at block 68-86 of method 66, illustrated in FIG. 3. For the sake of brevity, discussion of blocks 142-156 and blocks 166-168 will be largely omitted and the discussion of method 140 will focus on the iterative series of piston steps.

The first series of piston steps conducted at block 150 will have a relatively large distance between individual piston steps. Consequently, fewer images will be collected as part of a first plurality of images and, as a result, detailed data relating to the fringe patterns will not be collected throughout piston-sweep range 110 during the first series of piston steps. Rather, the goal of the first series of piston steps is to quickly pass through piston-sweep range 110 and to collect data that is sufficient to identify the general location of each fringe pattern, and correspondingly, the general location of each sub-aperture within piston-sweep range 110.

Figure 18:
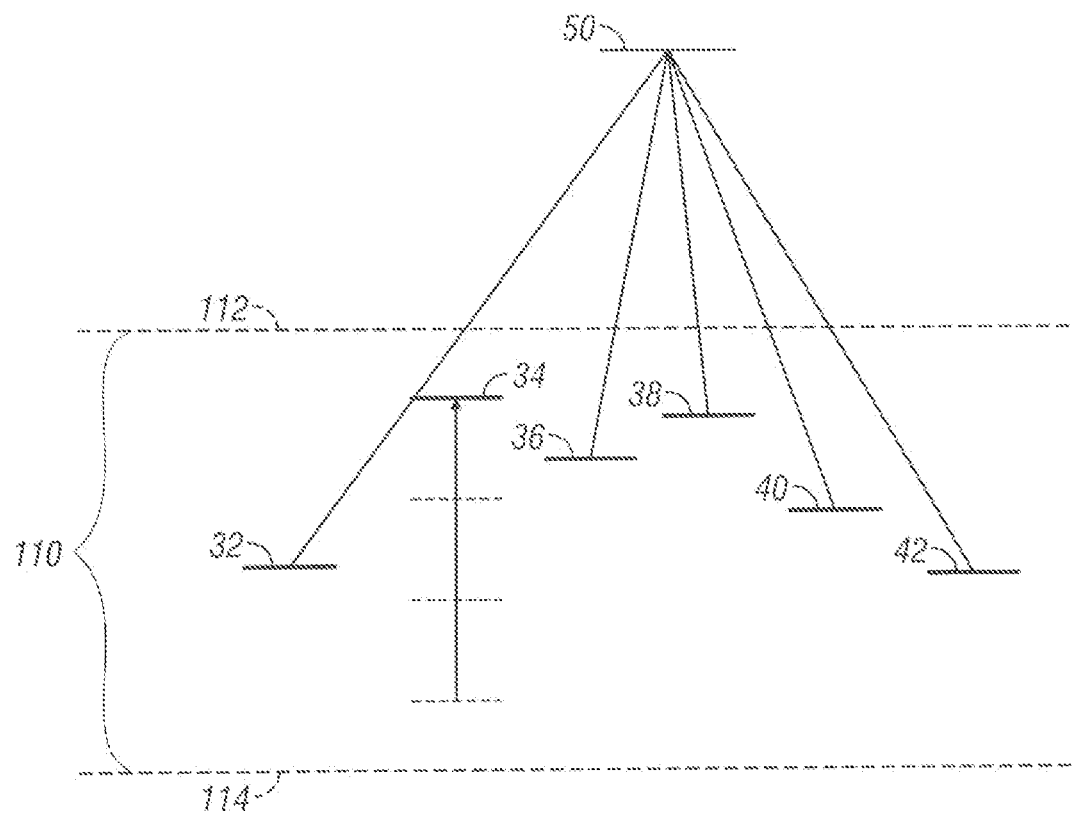
FIG. 18 is a schematic side view similar to FIG. 8 illustrating movement of the reference sub-aperture in a first series of relatively widely dispersed piston steps to collect data relating to a plurality of images of a point object with known spectral distribution, each image being obtained at each piston step.

FIG. 18 is a schematic side view illustrating movement of the reference sub-aperture (sub-aperture 34) in a first series of relatively widely dispersed piston steps to collect data relating relatively quickly throughout piston-sweep range 110. With continuing reference to FIGS. 1-17, a wide variety of suitable strategies may be employed for conducting the first series of piston steps. The strategy illustrated in FIG. 18 collects data at four discrete locations throughout piston-sweep range 110. In other embodiments, the first series of piston steps may have any desired number of steps and the number of steps and step size may even be adapt as the data are acquired.

At block 156 of method 140, a plurality of fringe patterns are detected within a three-dimensional data cube that is compiled using the data collected during the first series of piston steps.

Figure 19:
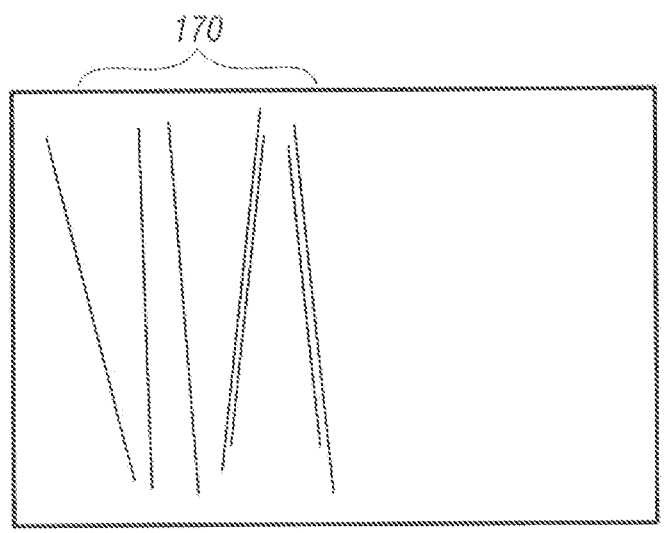
FIG. 19 is a representation of a cross section of a three-dimensional cube containing data related to images obtained at each piston step illustrated in FIG. 18, the cross section illustrating portions of multiple fringe patterns indicative of interference of light reflected by the reference sub-aperture and each of the other sub-apertures.

FIG. 19 is a cross-sectional view similar to the cross-sectional view depicted in FIG. 10, and shows the cross sections 170 of the plurality of three-dimensional fringe patterns that were detected during the first series of piston steps. However, because there was substantially less data collected during the first series of piston steps relative to the amount of data collected during the series of piston steps illustrated in FIG. 8, there is less data pertaining to each fringe pattern. Accordingly, the cross-sectional view illustrated in FIG. 19 provides less clarity and definition for each fringe pattern than the clarity and definition provided by the cross-sectional view in FIG. 10. Nevertheless, enough detail is provided in the three-dimensional data cube to determine the general location of each fringe pattern of plurality of fringe patterns and hence the general location of each sub-aperture within piston-sweep range 110. This information will be utilized during the second series of piston steps.

At block 158 of method 140, illustrated in FIG. 17, the piston mount associated with the reference sub-aperture (sub-aperture before) is actuated in a second series of piston steps. The second series of piston steps will not extend across the entire length of piston-sweep range 110 but rather will be focused on the portion of piston-sweep range 110 where each of the sub-apertures are known to be.

As indicated in block 160, at each piston step, data relating to an image of the distant point object will be collected. The distance between each piston step will be less than the distance between each piston step taken during the first series of piston steps. As a result, there will be more data available with which to compile the three-dimensional data cube.

Figure 20:
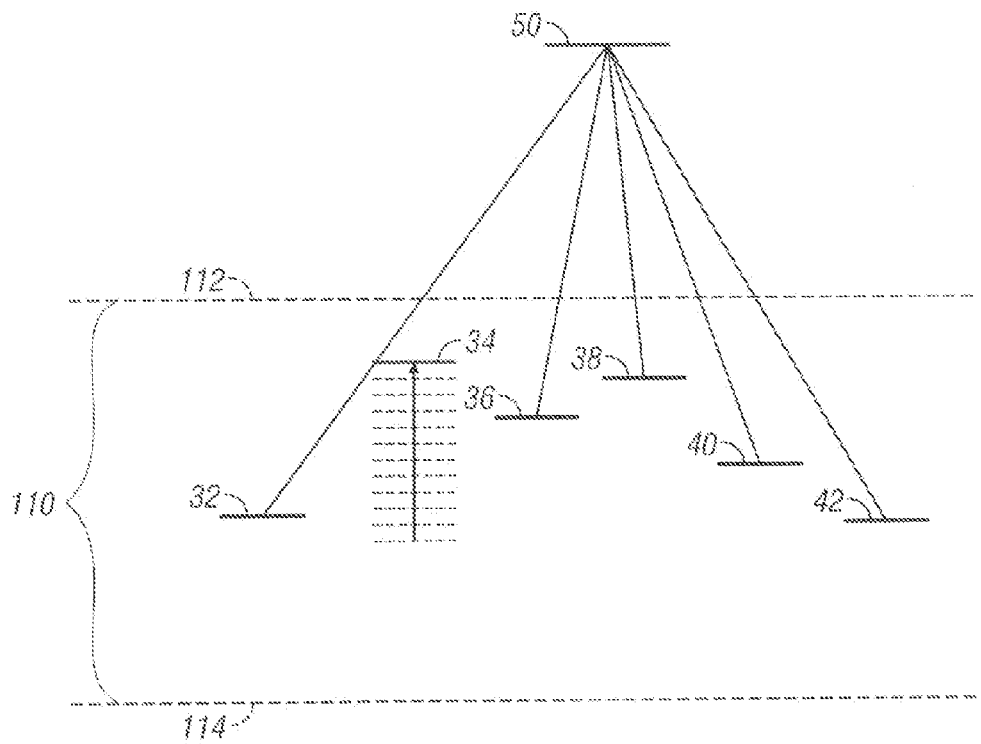
FIG. 20 is a schematic side view similar to FIG. 18 illustrating movement of the reference sub-aperture in a second series of relatively narrowly dispersed piston steps in a region of piston travel that corresponds with the location of the fringe patterns detected in FIG. 19.

FIG. 20 is a schematic side view illustrating movement of the reference sub-aperture (sub-aperture 34) in a second series of relatively narrowly dispersed piston steps in a region of piston travel that corresponds with the location where the sub-apertures are known to be located (which is based on the location of the fringe patterns within the three-dimensional data cube that was compiled after the first series of piston steps). The relatively small distance between each piston step of the second series of piston steps allows for far more data to be collected pertaining to the fringes than was collected during the first series of piston steps.

At block 162, the data that was collected during the second series of piston steps is compiled into the three-dimensional cube that was compiled after the first series of piston steps was completed, providing a data cube having a relatively dense amount of information in the areas where the fringe patterns were detected. At block 164, the plurality of fringe patterns are detected within the three-dimensional data cube.

Figure 21:
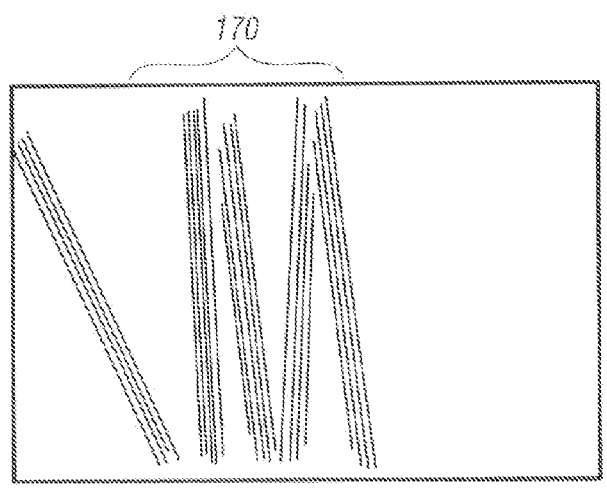
FIG. 21 is a representation of the cross section of FIG. 19 after the second series of piston steps has occurred and after data relating to images obtained at each piston step of the second series has been collected, the cross section now showing the fringe patterns with greater clarity and definition.

FIG. 21 is a representation of the cross section of FIG. 19 after the second series of piston steps has occurred and after data relating to images obtained at each piston step of the second series has been collected. As a result of the availability of additional data, the plurality of fringe patterns 170 shows each fringe with greater clarity and definition.

Once the fringe patterns have been detected within the three-dimensional data cube, the remainder of method 140 (illustrated at blocks 166 and 168) is substantially identical to the method steps depicted in blocks 84 and 86 of method 66, which are illustrated in FIG. 3 and which have been discussed at length above. For the sake of brevity, that discussion will not be repeated here.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for aligning a plurality of sub-apertures of a multiple-aperture imaging system, the method comprising:
    identifying one sub-aperture of the plurality of sub-apertures to serve as a reference sub-aperture;
    actuating a piston associated with the reference sub-aperture in a series of piston steps of a substantially known amount;
    collecting data relating to each image of a plurality of images of an object, each image corresponding to a respective piston step;
    compiling the data, with a processor, into a three-dimensional data cube;
    detecting, with the processor, a plurality of fringe patterns positioned within the three-dimensional data cube;
    determining, with the processor, a relative location of each sub-aperture of the plurality of sub-apertures based on a location of each fringe pattern of the plurality of fringe patterns within the three-dimensional data cube; and
    actuating a piston associated with at least one sub-aperture based, at least in part, on the relative location to move the at least one sub-aperture into alignment with another sub-aperture and repeating with each remaining sub-aperture until all sub-apertures are at substantially a same height.

2. The method of claim 1, wherein the detecting step comprises detecting a number of fringe patterns equal to one less than a total number of sub-apertures of the plurality of sub-apertures.

3. The method of claim 1, wherein the detecting step comprises detecting an orientation of each fringe pattern of the plurality of fringe patterns.

4. The method of claim 1, wherein the determining step comprises determining the location of each sub-aperture of the plurality of sub-apertures with respect to one sub-aperture of the plurality of sub-apertures.

5. The method of claim 1, wherein the determining step comprises determining the relative location of each sub-aperture of the plurality of sub-apertures with respect to a center point of all sub-apertures.

6. The method of claim 1, wherein the determining step comprises determining the relative location of each sub-aperture of the plurality of sub-apertures with respect to a center point of piston travel.

7. The method of claim 1, wherein the determining step comprises determining the relative location of each sub-aperture based on a distance between each respective fringe pattern and an end of the three-dimensional data cube.

8. The method of claim 1, wherein the step for actuating the piston associated with at least one sub-aperture comprises moving the at least one sub-aperture into alignment with another sub-aperture that is positioned closest to a center point of all sub-apertures and repeating with each remaining sub-aperture until all sub-apertures are substantially aligned with the sub-aperture that is positioned closest to the center point of all sub-apertures.

9. The method of claim 1, wherein the step for actuating the piston associated with at least one sub-aperture comprises moving a first sub-aperture to an approximate center point of all sub-apertures, moving a second sub-aperture into alignment with the first sub-aperture, and repeating with each remaining sub-aperture until all sub-apertures are positioned at the approximate center point of all sub-apertures.

10. The method of claim 1, wherein the step for actuating a piston associated with at least one aperture comprises moving a first sub-aperture to any desired position within a range of piston travel, moving a second sub-aperture into alignment with the first sub-aperture at the desired position, and repeating with each remaining sub-aperture until all sub-apertures are positioned at the desired position.

11. A method for aligning a plurality of sub-apertures of a multiple-aperture imaging system, the method comprising:
    identifying one sub-aperture of the plurality of sub-apertures to serve as a reference sub-aperture;
    actuating a piston associated with the reference sub-aperture in a first series of piston steps of a first substantially known amount;
    collecting data relating to each image of a first plurality of images of an object, each image of the first plurality of images corresponding to a respective piston step of the first series of piston steps;
    compiling the data relating to the first plurality of images, with a processor, into a three-dimensional data cube;
    detecting, with the processor, a plurality of fringe patterns positioned within the three-dimensional data cube;
    actuating the piston associated with the reference sub-aperture in a second series of piston steps of a second substantially known amount, the second series of piston steps occurring at a position corresponding with a location of the plurality of fringe patterns within the three-dimensional data cube, the second known amount being smaller than the first known amount;
    collecting data relating to each image of a second plurality of images of the point object, each image of the second plurality of images corresponding to a respective piston step of the second series of piston steps;
    compiling the data relating to the second plurality of images, with the processor, into the three-dimensional data cube;
    detecting, with the processor, the plurality of fringe patterns positioned within the three-dimensional data cube;

determining, with the processor, a relative location of each sub-aperture of the plurality of sub-apertures based on a location of each fringe pattern of the plurality of fringe patterns within the three-dimensional data cube; and actuating a piston associated with at least one sub-aperture based, at least in part, on the relative location to move the at least one sub-aperture into alignment with another sub-aperture and repeating with each remaining sub-aperture until all sub-apertures are at substantially a same height.

12. The method of claim 11, wherein a range of the second series of piston steps is smaller than an entire range of piston sweep for the reference sub-aperture.

13. The method of claim 11, wherein the first series of piston steps is terminated once a number of fringe patterns equal to one less than a total number of sub-apertures of the plurality of sub-apertures have been detected.

14. The method of claim 11, wherein the detecting step comprises detecting an orientation of each fringe pattern of the plurality of fringe patterns.

15. The method of claim 11, wherein the determining step comprises determining the location of each sub-aperture of the plurality of sub-apertures with respect to one sub-aperture of the plurality of sub-apertures.

16. The method of claim 11, wherein the determining step comprises determining the relative location of each sub-aperture of the plurality of sub-apertures with respect to a center point of all sub-apertures.

17. The method of claim 11, wherein the determining step comprises determining the relative location of each sub-aperture of the plurality of sub-apertures with respect to a center point of piston travel.

18. The method of claim 11, wherein the step for actuating the piston of the at least one sub-aperture comprises moving the at least one sub-aperture into alignment with a sub-aperture that is positioned closest to a center point of all sub-apertures and repeating with each remaining sub-aperture until all sub-apertures are substantially aligned with the sub-aperture that is positioned closest to the center point of all sub-apertures.

19. The method of claim 11, wherein the step for actuating the piston associated with at least one sub-aperture comprises moving a first sub-aperture to an approximate center point of all sub-apertures, moving a second sub-aperture into alignment with the first sub-aperture, and repeating with each remaining sub-aperture until all sub-apertures are positioned at the approximate center point of all sub-apertures.

20. A method for aligning a plurality of sub-apertures of a multiple-aperture imaging system, the method comprising:

combining an individual image of a point object from each sub-aperture of the plurality of sub-apertures to form an aggregated plurality of individual images of the point object;

determining a correspondence between each individual image of the aggregated plurality of individual images and each sub-aperture of the plurality of sub-apertures;

co-aligning all individual images of the aggregated plurality of individual images to form a stack of images, thus forming a single image of the point object;

identifying one sub-aperture of the plurality of sub-apertures to serve as a reference sub-aperture;

actuating a piston associated with the reference sub-aperture in a series of piston steps of a substantially known amount;

collecting data relating to each image of a plurality of images of the point object, each image corresponding to a respective piston step;

compiling the data, with a processor, into a three-dimensional data cube;

detecting, with the processor, a plurality of fringe patterns positioned within the three-dimensional data cube;

determining, with the processor, a relative location of each sub-aperture of the plurality of sub-apertures based on a location of each fringe pattern of the plurality of fringe patterns within the three-dimensional data cube; and actuating a piston associated with at least one sub-aperture based, at least in part, on the relative location to move the at least one sub-aperture into alignment with another sub-aperture and repeating with each remaining sub-aperture until all sub-apertures are at substantially a same height.

* * * * *